(12) United States Patent
Ohashi (10) Patent No.: US 8,973,631 B2
(45) Date of Patent: Mar. 10, 2015

(54) PNEUMATIC TIRE

(75) Inventor: Toshiyuki Ohashi, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 503 days.

(21) Appl. No.: 13/270,666

(22) Filed: Oct. 11, 2011

(65) Prior Publication Data

US 2012/0090749 A1  Apr. 19, 2012

(30) Foreign Application Priority Data

Oct. 13, 2010 (JP) ................. 2010-230821

(51) Int. Cl.
| | | |
|---|---|---|
| B60C 11/12 | (2006.01) | |
| B60C 11/13 | (2006.01) | |
| B60C 11/03 | (2006.01) | |

(52) U.S. Cl.
CPC ......... B60C 11/1281 (2013.04); B60C 11/1218 (2013.04); *B60C 11/0302* (2013.04); *B60C 2011/1209* (2013.04); *B60C 2011/1254* (2013.04); *Y10S 152/03* (2013.01)
USPC ............. 152/209.22; 152/DIG. 3; 152/209.18

(58) Field of Classification Search
USPC ........................... 152/DIG. 3, 209.22, 209.18
IPC ...................................................... B60C 11/12
See application file for complete search history.

(56) References Cited

U.S. PATENT DOCUMENTS

| | | | |
|---|---|---|---|
| 6,523,586 B1 | 2/2003 | Eromaki et al. | |
| 6,561,242 B2 * | 5/2003 | Chaen et al. ............. | 152/209.18 |
| 2001/0022209 A1 | 9/2001 | Chaen et al. | |
| 2005/0269003 A1 | 12/2005 | Fujii et al. | |
| 2006/0037683 A1 | 2/2006 | Cuny et al. | |
| 2008/0115870 A1 | 5/2008 | Ohashi et al. | |
| 2010/0084062 A1 | 4/2010 | Miyazaki et al. | |
| 2010/0218867 A1 | 9/2010 | Matsumoto | |

FOREIGN PATENT DOCUMENTS

| | | | | |
|---|---|---|---|---|
| EP | 0933235 A2 | 8/1999 | | |
| FR | 2924981 A1 | * 6/2009 | ............. | B60C 11/12 |
| JP | 02241804 A | * 9/1990 | ............. | B60C 11/11 |
| JP | 9-272312 A | 10/1997 | | |
| JP | 2005-104188 A | 4/2005 | | |
| JP | 2005-247105 A | 9/2005 | | |
| JP | 2010-089541 A | 4/2010 | | |
| JP | 2010-089720 A | 4/2010 | | |

OTHER PUBLICATIONS

Office Action dated Aug. 14, 2014, issued in corresponding Chinese Patent Application No. 201110283479.0, with English Translation (12 pages).

* cited by examiner

*Primary Examiner* — Richard Crispino
*Assistant Examiner* — Philip N Schwartz
(74) *Attorney, Agent, or Firm* — Westerman, Hattori, Daniels & Adrian, LLP (57) ABSTRACT

In a pneumatic tire in which the sipe extending in a direction crossing a tire circumferential direction is provided on a land portion (block) of a tread portion, a wide part having a wide groove width is provided at three or more places in a length direction of the sipe, and the wide part and a narrow part are formed alternately on a tread surface along the sipe length direction. A plurality of the wide parts are extended in a sipe depth direction from the tread surface, and are provided by changing extended lengths in the sipe depth direction.

16 Claims, 9 Drawing Sheets

NEW TIRE

FIG. 5B

25% WORN TIRE

FIG. 5C

50% WORN TIRE

FIG. 5D

TWI

FIG. 10A
NEW TIRE

FIG. 10B
25% WORN TIRE

FIG. 10C
50% WORN TIRE

FIG. 10D
TWI

NEW TIRE

FIG. 12B

30% WORN TIRE

FIG. 12C

60% WORN TIRE

FIG. 13

COMPRATIVE EXAMPLE 3

PNEUMATIC TIRE

CROSS-REFERENCE TO RELATED APPLICATIONS

This application is based upon and claims the benefit of priority from the prior Japanese Patent Application No. 2010-230821, filed on Oct. 13, 2010; the entire contents of which are incorporated herein by reference.

BACKGROUND OF THE INVENTION

1. Technical Field

The present invention relates to a pneumatic tire, and particularly relates to a pneumatic tire having a sipe formed on a land portion of a tread portion.

2. Background Art

A land portion such as a block or a rib is provided on a tread portion of a pneumatic tire, a cut having a narrow groove width called a sipe is sometimes provided on the land portion. Formation of the sipe increases running performance and braking performance on a snow and ice road surface and the like by its edge effect and water removal effect. Generally, the sipes are formed at a constant groove width in its length direction. In such a case, the sipes are uniformly closed by, for example, a backward and forward force loaded at the time of braking, and this gives rise to the problem that the inherent edge effect of the sipe is decreased.

JP-A-09-272312 (1997) proposes that a wide part having a wide groove width from a tread surface to a sipe bottom is provided on at least three places in a length direction of the sipe. Formation of such a wide part prevents the sipe from closing as a whole, thereby the edge effect can be improved. However, in JP-A-09-272312, all of the wide parts extend from the tread surface to the sipe bottom. This structure gives rise to the problem that rigidity difference between a stepping side and a kicking side is large in the wide part, and a toe and heel wear amount is large.

JP-A-2005-247105 proposes that a first wide part which extends from a tread surface in a depth direction and is terminated in the halfway to a bottom of a sipe and a second wide part which extends from almost the same height as the bottom of the first wide part to the sipe bottom are provided on the sipe. JP-A-2010-089541 proposes that a wide part which has an inclined plane inclined such that a groove width is decreased toward a sipe bottom side in an opening of the sipe is alternately provided on both sipe walls along a length direction of the sipe. Those structures can prevent the sipe as a whole from closing in at least an initial stage of wear. However, the structures are not a structure having rigidity difference such that the rigidity is increased stepwise in the length direction of the sipe. Therefore, the structures are difficult to achieve both the edge effect and the toe and heel wear suppressing effect, similar to the above JP-A-09-272312.

SUMMARY OF THE INVENTION

The present invention has been made in view of the above circumstances, and has an object to provide a pneumatic tire that can suppress toe and heel wear in a sipe while maintaining an edge effect by the sipe.

The pneumatic tire according to the present invention is a pneumatic tire having a sipe extending in a direction crossing a tire circumferential direction, provided on a land portion of a tread portion, wherein the sipe is provided with a wide part having a wide groove width on at least three places in a length direction of the sipe, and the wide part and a narrow part having small groove width are alternately formed on a tread surface along the length direction of the sipe. A plurality of the wide parts is extended in a depth direction of the sipe from the tread surface, and includes a wide part having a different extended length in a depth direction of the sipe.

DETAILED DESCRIPTION OF THE INVENTION

Hereinafter, embodiments of the present invention are described referring to the drawings.

First Embodiment

The pneumatic tire according to the first embodiment comprises a pair of right and left bead portions, a pair of right and left side wall portions, and a tread portion 10 provided between both side wall portions so as to mutually connect outward ends in a radial direction of the right and left side wall portions, although not shown. The tire further comprises a carcass extending across a pair of the bead portions. The carcass comprises at least one carcass ply which passes the side wall portion from the tread portion 10, the both ends of which being locked by a ring-shaped bead core, and reinforces the above each portion. The bead core is embedded in the bead portion. A belt comprising at least two layers of a rubber-covered steel cord layer is provided at an outer periphery side of the carcass in the tread portion 10, and the belt reinforces the tread portion 10 in the outer periphery of the carcass.

Figure 1:
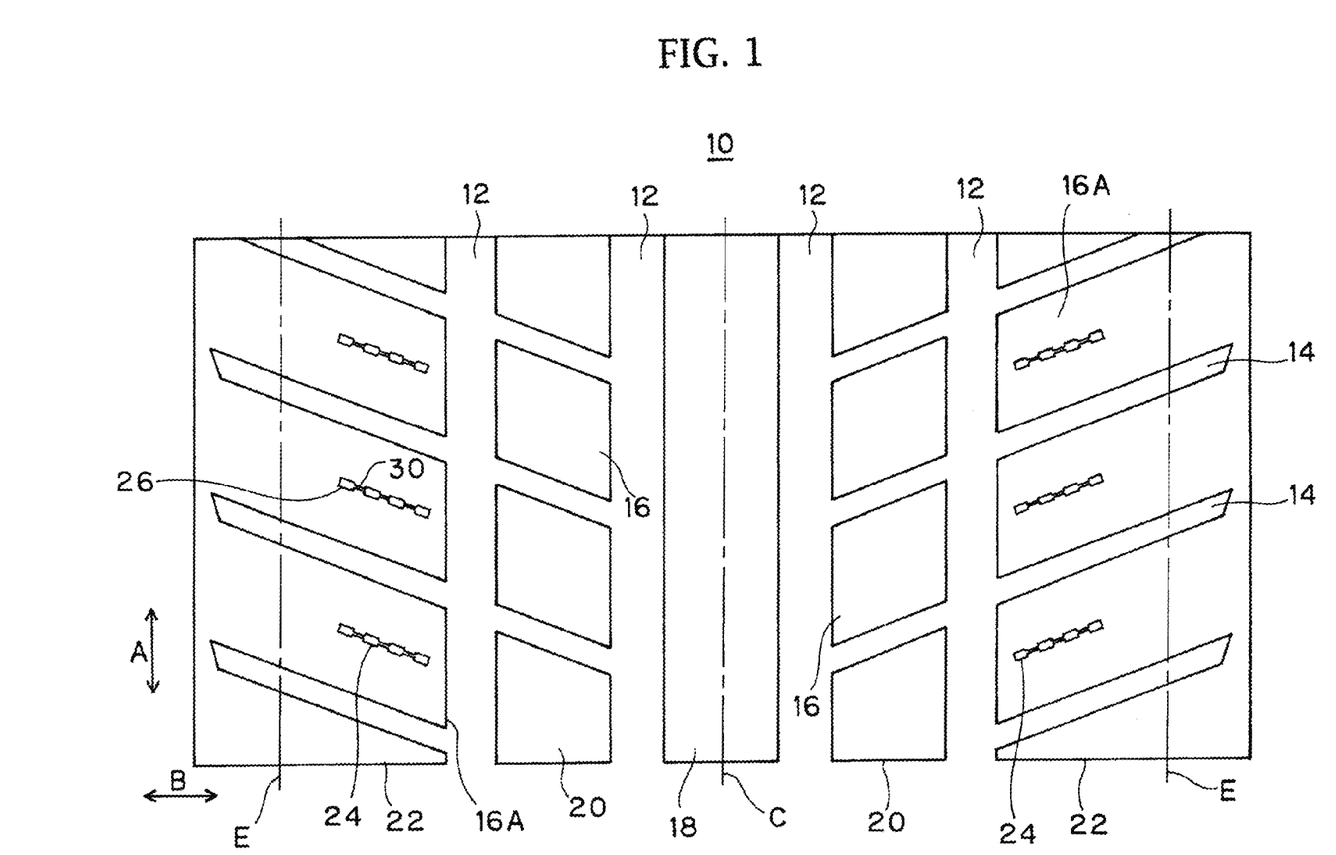
FIG. 1 is a development view showing a tread pattern of the tire according to a first embodiment.

A plurality of circumferential grooves (main grooves) 12 extending in a straight shape in a tire circumferential direction A and a plurality of transverse grooves 14 crossing the circumferential grooves 12 are provided on the surface of the tread portion 10 as shown in FIG. 1. By this constitution, the tread portion 10 is provided with a plurality of blocks 16 partitioned with the circumferential grooves 12 and the transverse grooves 14. In this case, four circumferential grooves 12 are provided in a tire width direction B. By this structure, the tread portion 10 is partitioned into five regions; a center region 18 on a tire center line C, intermediate regions 20, 20 formed at the both sides of the center region 18 across the center region 18, and shoulder regions 22, 22 at both ends formed at further outer sides of the intermediate regions 20, 20, in the tire width direction B. The transverse grooves 14 are juxtaposed on the intermediate region 20 and the shoulder region 22 at given intervals in the tire circumferential direction A. By this structure, the intermediate region 20 and the shoulder region 22 each are constituted as a block row comprising a number of blocks 16 juxtaposed in the tire circumferential direction A. On the other hand, the transverse groove is not provided on the center region 18. As a result, the center region 18 is formed as a rib continuously extending in the tire circumferential direction A. In FIG. 1, the sign E means a tread ground contact end.

A sipe 24 extending in a direction crossing the tire circumferential direction A is provided on a block 16A (hereinafter referred to as a "shoulder block") which is a land portion provided on the shoulder region 22. The sipe 24 is a cut having both ends which do not open to a block edge. That is, the sipe 24 is a cut which does not open to the circumferential groove 12 and is terminated in the block, and is called a closed sipe. The sipe 24 is a linear sipe extending in the tire width direction B, and one sipe 24 is provided on each block 16A. In this case, the sipe 24 extends in a direction slightly inclined to the tire width direction B, but may extend parallel to the tire width direction B.

The constitution of the sipe 24 is described in detail below by reference to FIGS. 2 to 5. The sipe 24 is provided with a wide part 26 having a large groove width in plural places of its length direction G, and by this constitution, the wide part 26 and a narrow part 30 having a small groove width are alternately formed on at least a tread surface 28 along the sipe length direction G. In this case, the wide parts 26 are provided at equal intervals on the total four places, both ends in the length direction G of the sipe 24 and two places between the both ends.

Figure 2:
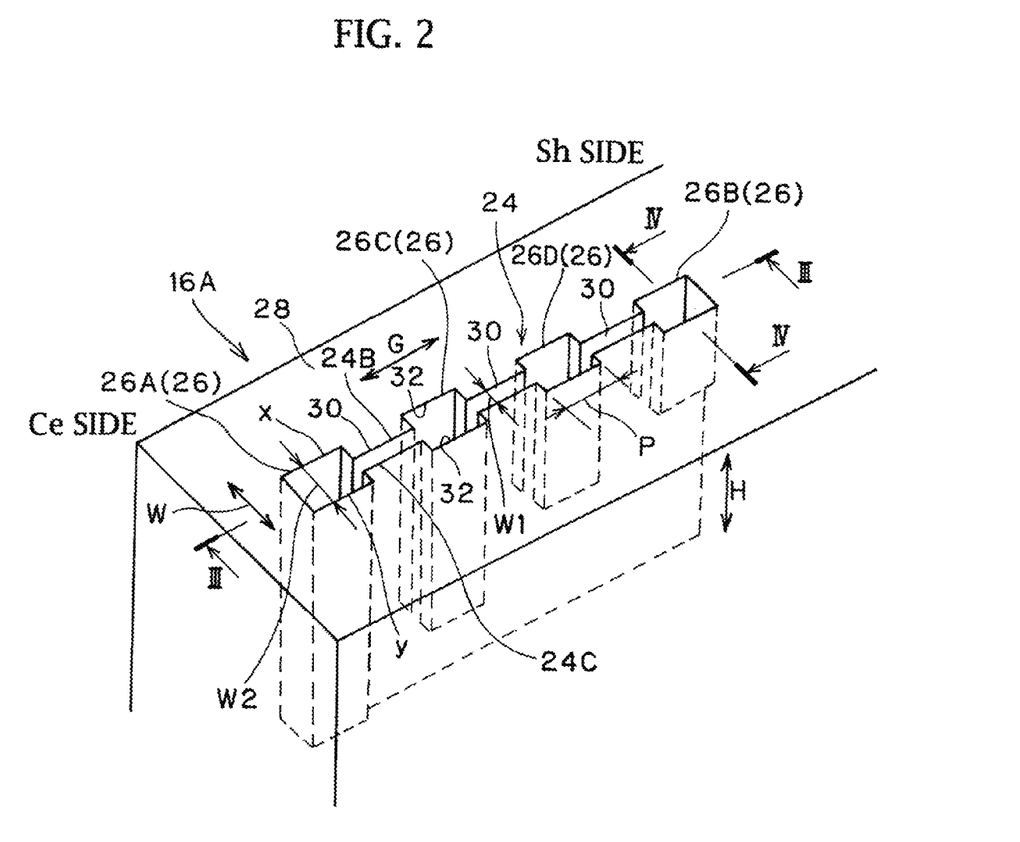
FIG. 2 is a perspective view of a block according to the first embodiment.
Figure 3:
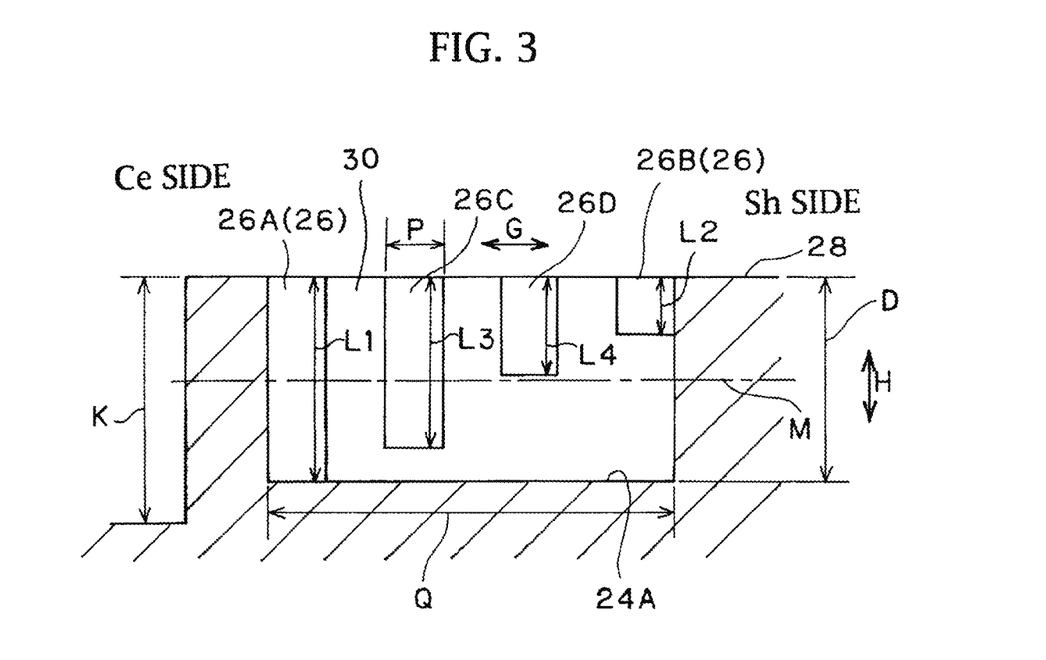
FIG. 3 is a cross-sectional view taken along III-III line in FIG. 2.
Figure 4:
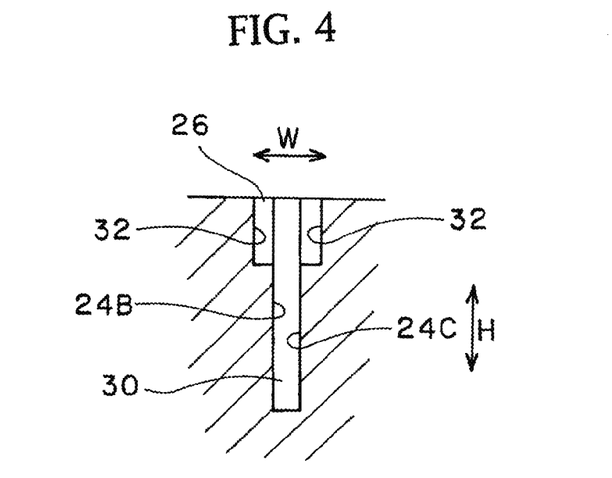
FIG. 4 is a cross-sectional view taken along IV-IV line in FIG. 2.

The wide part 26 is formed by providing depressions 32, 32 facing wall surfaces 24B, 24C, respectively, of the sipe 24, as shown in FIGS. 2 and 4. That is, the wide part 26 is formed by expanding the groove width at both sides in a groove width direction W relative to the narrow part 30. Groove width W1 of the narrow part 30 can be the general sipe width, and is not particularly limited. However, the groove width W1 is preferably about 0.3 to 1.0 mm. Groove width W2 of the wide part 26 is not particularly limited, but is generally 2 times or more the groove width W1 of the narrow part 30. Specifically, the groove width W2 is preferably about 0.8 to 3.0 mm. The wide part 26 has a rectangular shape in planar view as shown in FIGS. 5A to 5D. As shown in FIGS. 2 to 4, the groove width W2 is constant in a sipe depth direction H, and a size P of the sipe length direction G is set constant in the sipe depth direction H. In this case, the size P is set to be the same in the four wide parts 26, but the size P may be changed in each wide part 26.

The wide part 26 extends in the sipe depth direction H from the tread surface 28, and is set such that the extended length in the sipe depth direction H all differs among plural wide parts 26. In this case, the four wide parts 26 are set such that the extended length in the sipe depth direction H is sequentially decreased as the wide parts 26 approach a ground contact end E side (hereinafter referred to as "ground contact end side Sh", and indicated as "Sh side" in the drawings).

In detail, as shown in FIG. 3, the wide parts 26 comprise a deepest wide part 26A having the maximum extended length L1 in the sipe depth direction H, a shallowest wide part 26B having the minimum extended length L2, and two intermediate wide parts 26C, 26D having extended lengths L3, L4, respectively, between the deepest wide part 26A and the shallowest wide part 26B. L3 and L4 are smaller than L1 and larger than L2.

The deepest wide part 26A is provided at the end of a tire center line C side (hereinafter referred to as "center line side Ce, and indicated as "Ce side" in the drawings) in the length direction G of the sipe 24. The deepest wide part 26A extends at a sipe bottom side than a center M of the sipe depth direction H. In this case, the deepest wide part 26A extends up to a sipe bottom 24A and is formed over the whole sipe depth D. The center M used herein is an intermediate position of the sipe depth direction H, corresponding to a height of D/2 from a tread surface 28.

The shallowest wide part 26B is provided at the end of the ground contact end side Sh in the length direction G of the sipe 24. The shallowest wide part 26B is terminated at the tread surface 28 side than the center M of the sipe depth direction H.

The intermediate wide parts 26C, 26D are provided between the deepest wide part 26A and the shallowest wide part 26B in the sipe length direction G. A first intermediate wide part 26C adjacent to the deepest wide part 26A is set to have an extended length larger than that of a second intermediate wide part 26D adjacent to the shallowest wide part 26B (L3>L4). In this case, the first intermediate wide part 26C extends to the sipe bottom side than the center M of the sipe depth direction H, and the second intermediate wide part 26D is terminated at the tread surface 28 side than the center M. By setting as above, the extended lengths of the four wide parts 26 are sequentially decreased from the center line side Ce toward the ground contact end side Sh.

The portions at which three wide parts 26B, 26C, 26D excluding the deepest wide part 26A are provided are constituted so as to change from the wide part 26 to the narrow part 30 in the sipe depth direction H.

In detail, at the position where other wide parts 26B, 26C and 26D excluding the deepest wide part 26A have been provided in the sipe length direction G, the narrow part 30 is provided below the wide parts 26B, 26C and 26D in the sipe depth direction H, and is constituted so as to change from the wide part 26 to the narrow part 30 with the progress of wear of the block 16A. In this example, the sipe 24 is that the depth D is constant over the entire length direction G and is terminated at the narrow part 30 in the depth direction H at the position excluding the deepest wide part 26A, as shown in FIG. 3.

Figure 5A:
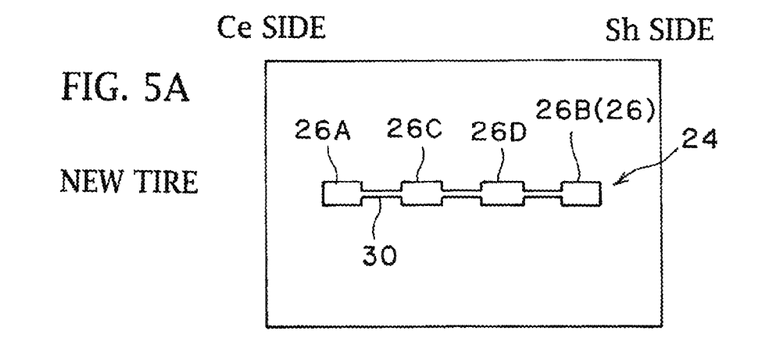
FIGS. 5A to 5D are plane views in each wear stage of the sipe according to the first embodiment.
Figure 5B:
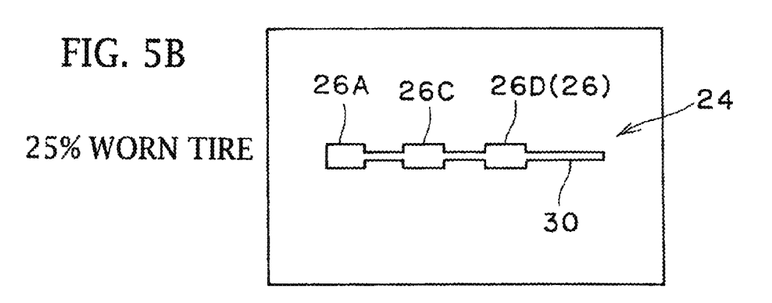
Figure 5C:
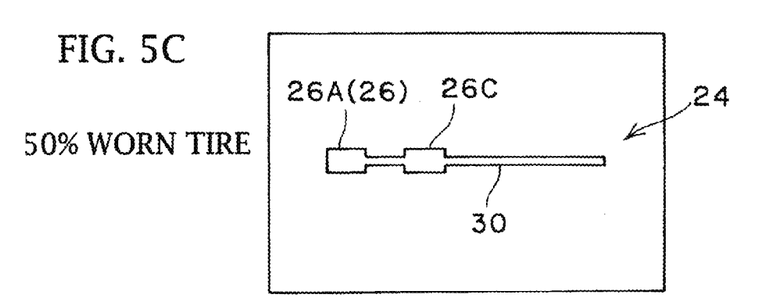
Figure 5D:
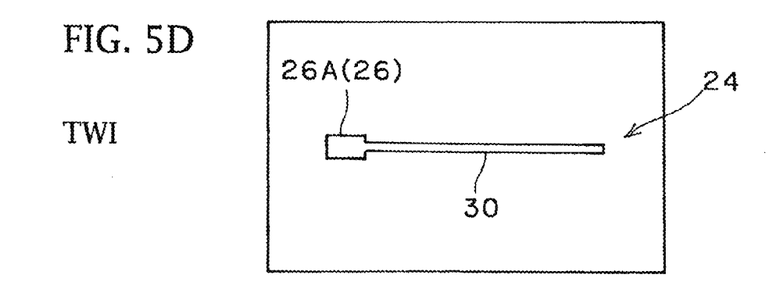

The sipe 24 having the above constitution has an opening shape having four wide parts 26 as shown in FIG. 5A when the tire is a new tire and at the initial stage of wear. The wear proceeds from this state, and at the stage that the height of the shoulder block 16A has worn 25%, the shallowest wide part 26B at the ground contact end side Sh disappears and changes into the narrow part 30, as shown in FIG. 5B, thereby an opening shape having three wide parts 26 is formed. The wear further proceeds and at the stage of 50% wear, the second intermediate wide part 26D adjacent to the shallowest wide part 26B disappears and changes into the narrow part 30, as shown in FIG. 5C, thereby an opening shape having two wide parts 26 is formed. The wear further proceeds, and at the stage that the wear reached TWI (Tread Wear Indicator) not shown (at the stage of 80% wear), the first intermediate wide part 26C further disappears and changes to the narrow part 30, as shown in FIG. 5D, thereby an opening shape having only the deepest wide part 26A as the wide part 26 is formed. Thus, with the progress of the wear, the wide parts 26 sequentially disappear from the ground contact end side Sh, and change into the narrow part 30.

According to this embodiment, at the time of a new tire, the narrow part 30 of the sipe 24 is easily contacted at the time of braking on a snowy road, and the sipe 24 is closed in the portion, thereby an edge effect is impaired. However, wide parts 26 having a large groove width are alternately provided, and high edge effect is obtained in the portions. As a result, snow braking performance can be obtained.

In the wide part 26, the toe and heel wear easily occurs by rigidity difference between an edge x of a stepping side and an edge y of a kicking side (see FIG. 2), which are opening edges facing the tire circumferential direction A, as compared with the narrow wide part 30. However, the toe and heel wear amount can be reduced by that the wide parts 26 gradually disappear from the ground contact end side Sh with the progress of wear. In detail, a pneumatic tire generally has a ground contact pressure distribution that the ground contact pressure is increased in the shoulder region 22 of a tread, particularly at the ground contact end side Sh in the shoulder region, during the general running, especially at the time of braking. On the other hand, the rigidity difference between a stepping side and a kicking side is decreased in the part as the wide part 26 has smaller extended length. For this reason, by constituting that the wide parts 26 gradually disappear from the ground contact end side Sh having high ground contact pressure in the course of the wear, the rigidity difference in the wide part 26 is small as the wide part 26 has higher ground contact pressure, and the wide part 26 early disappears with the wear. Therefore, the toe and heel wear can effectively be reduced.

On the other hand, when the wide parts 26 are decreased with the wear, reduction in the edge effect is a concern. However, the rigidity of the block itself is increased by that the height of the block 16A is decreased with the wear. As a result, the mutual contact amount of the wall surfaces 24B, 24C of the sipe 24 can be reduced, and the edge effect can be maintained.

In the present embodiment, the wide part 26 is formed so as to project to jut out into both sides of the groove width direction W to the narrow part 30. Therefore, when the sipe 24 is closed at the narrow part 30 at the time of braking on a snowy road and the like, the edge effect can further be increased in the wide part 26.

According to the present embodiment described above, the toe and heel wear in the wide part 26 can be suppressed while maintaining the edge effect by the sipe 24.

Furthermore, the opening shape of the sipe 24 changes with the wear. Therefore, this can bring about a role as an indicator indicating the wear amount of the tread portion 10.

Second Embodiment

Figure 6:
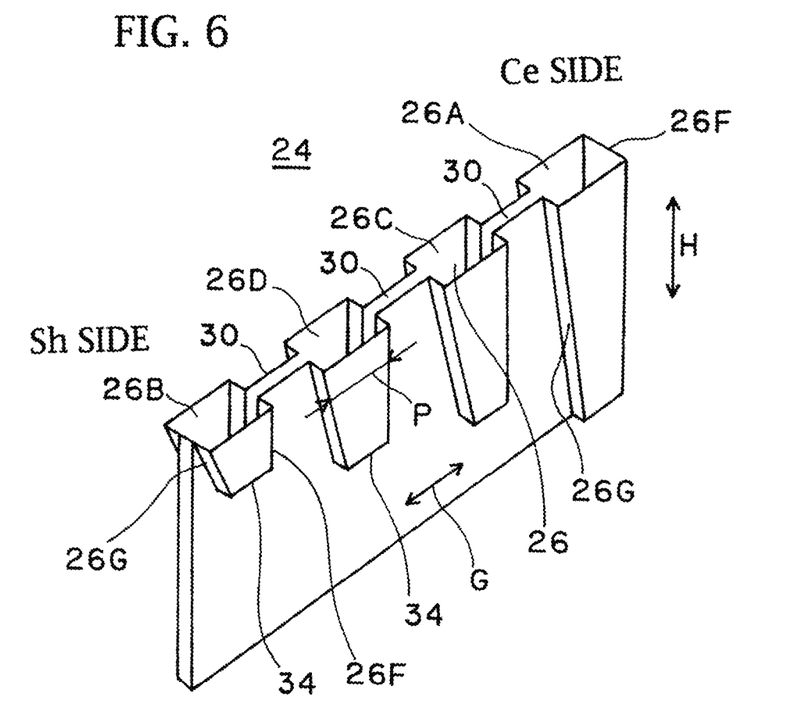
FIG. 6 is a perspective view of the sipe according to a second embodiment.

As shown in FIG. 6, the sipe 24 according to the second embodiment differs from that of the first embodiment in that the wide parts 26 are formed such that the size P in the sipe length direction G is gradually decreased with approaching the bottom side. FIG. 6 is a view that the sipe 24 as a hollow portion is shown in three dimensions (that is, a rubber constituting the block 16A is omitted), and corresponds to a blade shape of a mold for forming the sipe 24.

In detail, four wide parts 26 each are that a side 26F at its center line side Ce is vertically formed to the tread surface 28, and a side 26G at the ground contact end side Sh is formed in a inclined plane shape inclining to the center line side Ce as it approaches the sipe bottom side. However, each wide part 26 is that a planar bottom 34 is secured on the bottom of each wide part 26 so as to form a rectangular opening shape in a planar view over the entire sipe depth direction H.

In the second embodiment, the size P of the wide part 26 is formed so as to decrease with approaching the bottom side, and this constitution can decrease the rigidity difference between the stepping side and the kicking side of each wide part 26. Furthermore, because the size P is decreased by inclining the side 26G of the ground contact end side Sh having higher ground contact pressure as above, the toe and heel wear can further be suppressed. Other constitutions and the effects in the second embodiment are the same as in the first embodiment, and their explanations are omitted.

Third Embodiment

Figure 7:
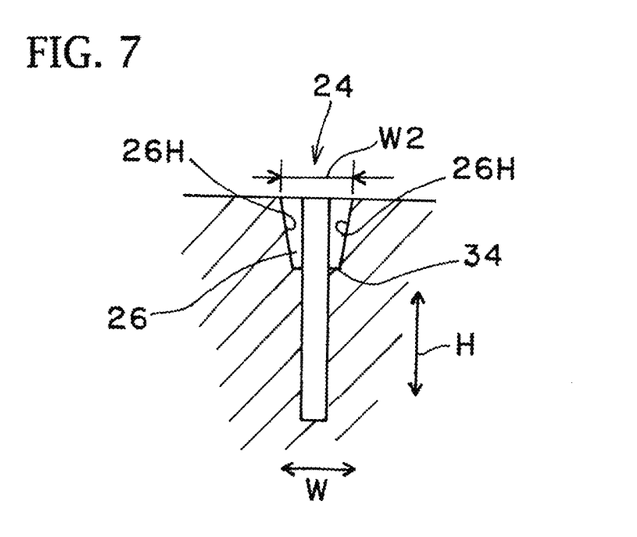
FIG. 7 is a cross-sectional view of the sipe according to a third embodiment.

As shown in FIG. 7, the sipe 24 according to the third embodiment differs from that of the first embodiment in that the wide parts 26 are formed such that a groove width W2 is gradually decreased with approaching its bottom side.

In detail, four wide parts 26 are formed in an inclined plane shape inclining such that wall surfaces 26H, 26H facing the groove width direction W mutually approach as those approach the bottom side. However, each wide part 26 is that a planar bottom 34 is secured on the bottom of each wide part 26 so as to form a rectangular opening shape in a planar view over the entire sipe depth direction H.

In the third embodiment, the groove width W2 of the wide part 26 is formed so as to decrease as it approaches the bottom side, and this constitution can decrease the rigidity difference between the stepping side and the kicking side of each wide part 26. As a result, the toe and heel wear can further be suppressed. Other constitutions and the effects in the third embodiment are the same as in the first embodiment, and their explanations are omitted. The constitution of the second embodiment may be combined with the constitution of the above third embodiment.

Fourth Embodiment

Figure 8:
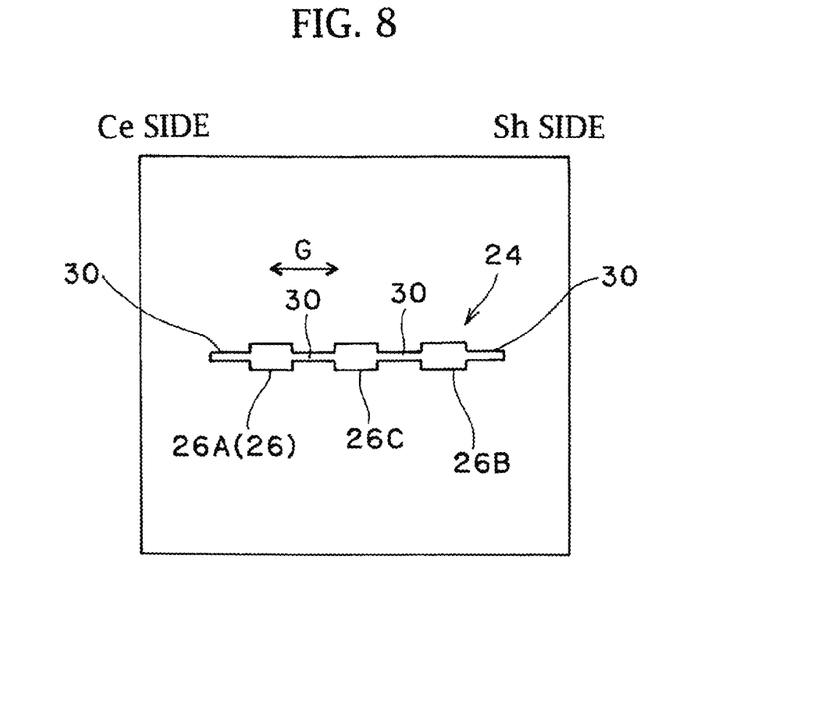
FIG. 8 is a plane view of the sipe according to a fourth embodiment.

As shown in FIG. 8, the sipe 24 according to the fourth embodiment is that the wide parts 26 are provided at three places on the sipe length direction G. Furthermore, in the sipe length direction G, the narrow parts 30 are provided at both outer sides of the wide parts 26. That is, in this case, the sipe 24 is provided with the narrow parts 30 at both ends of the longitudinal direction G, and three wide parts 26 are alternately provided together with the narrow parts 30 between the both ends. The wide parts 26 comprise the deepest wide part 26A provided at the center line side Ce, the shallowest wide part 26B provided at the ground contact end side Sh, and one intermediate wide part 26C provided therebetween. Other constitutions in the fourth embodiment are the same as in the first embodiment, and the same effects as in the first embodiment are basically developed.

Fifth Embodiment

Figure 9:
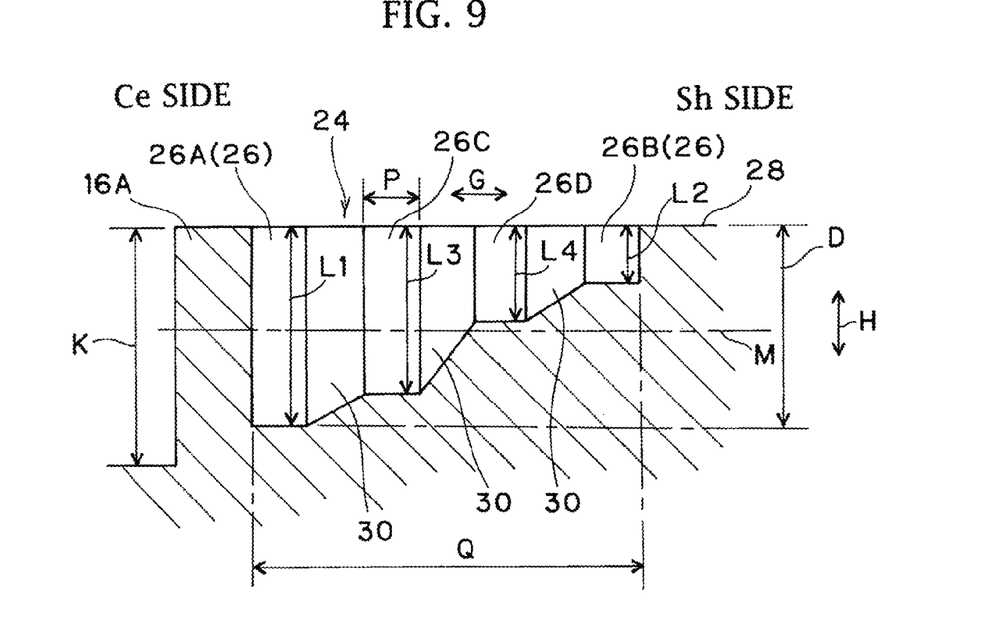
FIG. 9 is a cross-sectional view of a block according to the fifth embodiment.

As shown in FIGS. 9 and 10, the sipe 24 according to the fifth embodiment differs from that of the first embodiment in that the narrow part 30 is not provided below each of the wide parts 26A to 26D.

That is, at the position where four wide parts 26A to 26D are provided in the sipe length direction G, the narrow part 30 is not provided down the wide parts 26A to 26D in the sipe depth direction H, and at the wide parts 26A to 26D each the sipe 24 is terminated in the depth direction H. The narrow part 30 sandwiched between the wide parts 26A to 26D is formed by gradually changing the extended depth so as to join lower ends of the wide parts 26 at both sides, having different extended lengths L1 to L4 in a gradient shape.

By this constitution, the sipe 24 sequentially disappears from the end side (that is, the ground contact end side Sh) having provided thereon the wide part (that is, the shallowest wide part 26B) having small extended length with the progress of wear of the block 16A.

Figure 10A:
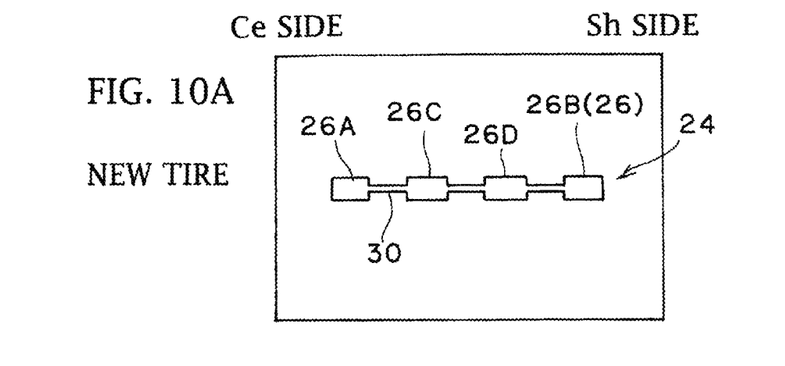
FIGS. 10A to 10D are plane views in each wear stage of the sipe according to the fifth embodiment.
Figure 10B:
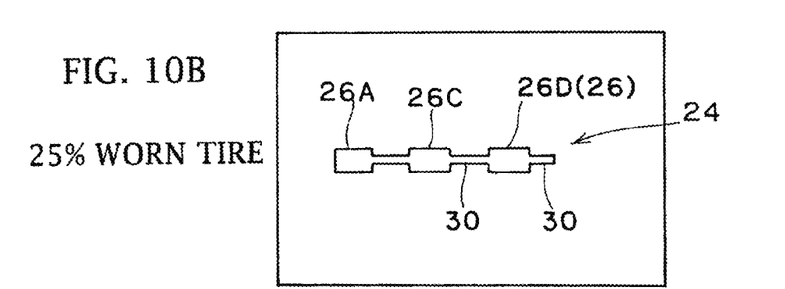
Figure 10C:
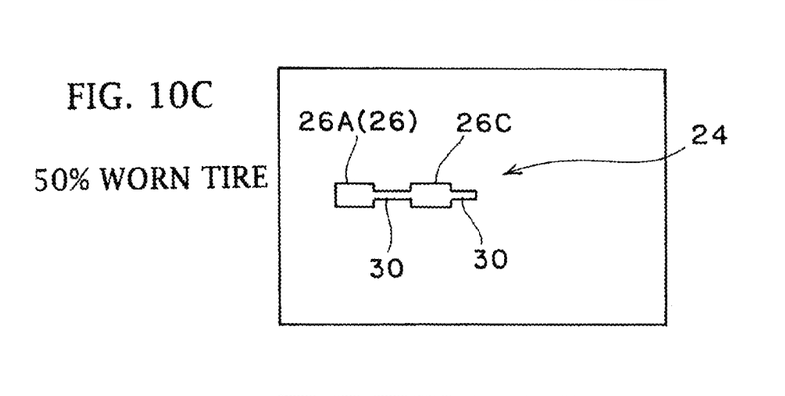
Figure 10D:
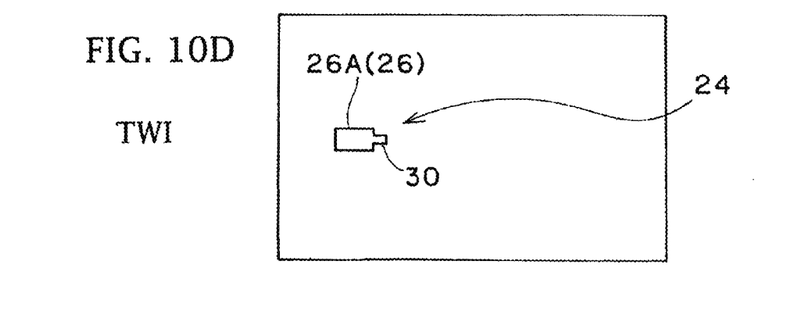

In detail, the sipe 24 having the above constitution has an open shape having four wide parts 26 similar to the first embodiment, as shown in FIG. 10A when the tire is a new tire or at the initial stage of wear. The wear proceeds from this state, and at the stage that the height of the block 16A has worn 25%, the shallowest wide part 26B at the ground contact end side Sh disappears as shown in FIG. 10B, and furthermore, the narrow part 30 disappears from the end thereof. The wear further proceeds, and at the stage that the height of the block 16A has worn 50%, the second intermediate wide part 26D disappears, and the sipe has an opening shape having two wide parts 26, as shown in FIG. 10C. Thus, the length of the sipe becomes half the original length. The wear further proceeds, and at the stage that the wear has reached TWI not shown (the stage of 80% wear), the first intermediate wide part 26C further disappears, and the sipe has an opening shape substantially having only the deepest wide part 26A, as shown in FIG. 10D. Thus, the wide parts 26 sequentially disappear from the ground contact end side Sh with the progress of wear, and the length of sipe becomes short. As a result, in making the sipe 24 have the function as a wear indicator, the visibility can further be improved.

The narrow part 30 is not provided below each of the wide parts 26A to 26D. Therefore, rigidity difference between a stepping side and a kicking side can further be decreased in each of the wide parts 26A to 26D. As a result, the toe and heel wear can further be reduced as compared with the first embodiment.

In the case of the present embodiment, the length of the sipe 24 is decreased with the progress of wear. Therefore, the edge effect after wear is poor as compared with the first embodiment. However, the edge effect can be maintained by the residual wide parts 26, and the snow braking performance can be secured. Other constitutions and effects in the fifth embodiment are the same as in the first embodiment, and the description thereof is omitted.

Sixth Embodiment

Figure 11:
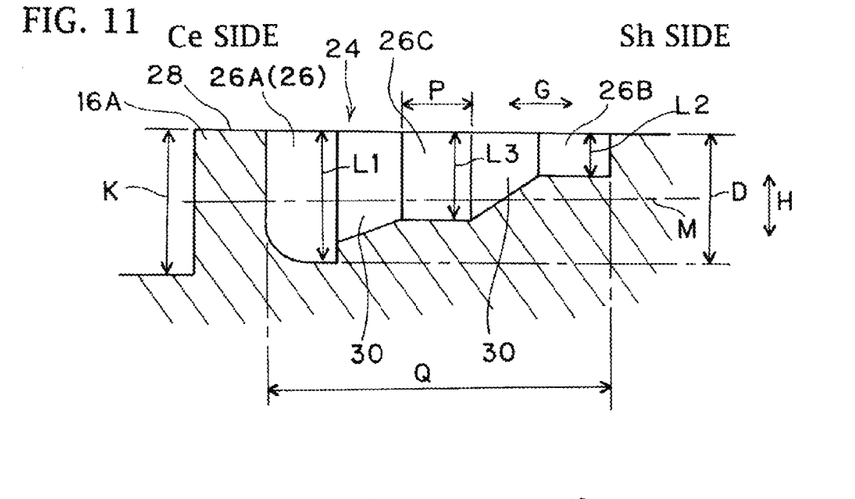
FIG. 11 is a cross-sectional view of a block according to the sixth embodiment.
Figure 12A:
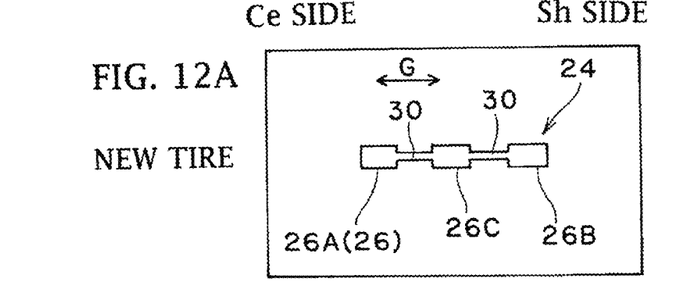
FIGS. 12A to 12C are plane views in each wear stage of the sipe according to the sixth embodiment.
Figure 12B:
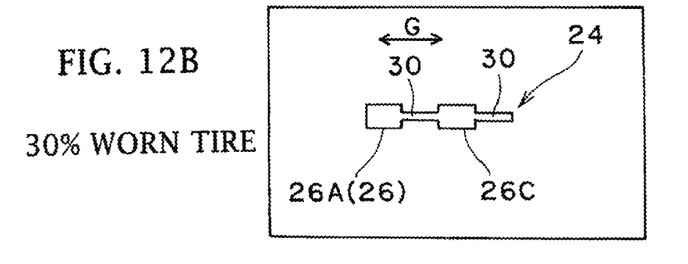
Figure 12C:
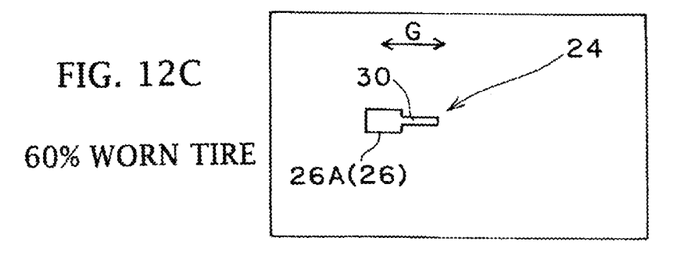

The sipe 24 according to the sixth embodiment differs from that of the fifth embodiment having the wide parts 26 provided at four places, in that the wide parts 26 are provided at three places in the sipe length direction G as shown in FIGS. 11 and 12.

That is, in this example, the wide parts 26 are provided at three places in total of both ends in the sipe length direction G, and one place of the central portion, at equal intervals, and the narrow parts 30 are provided therebetween. The wide part 26 comprises the deepest wide part 26A provided at the center line side Ce, the shallowest wide part 26B provided at the ground contact end side Sh, and the intermediate wide part 26C provided therebetween.

Other constitutions are basically the same as in the fifth embodiment. Therefore, at the position where three wide parts 26A to 26C have been provided in the sipe length direction G, the narrow part 30 is not provided below the wide parts 26A to 26C in the sipe depth direction H, and the sipe 24 is terminated at each of the wide parts 26A to 26C in the depth direction H. Furthermore, the narrow part 30 sandwiched between the wide parts 26A to 26C is formed by gradually changing the extended depth so as to join lower ends of the wide parts 26 at both sides, having different extended lengths L1 to L3 in a gradient shape. By this constitution, the sipe 24 sequentially disappears from the end side (that is, the ground contact end side Sh) having provided thereon the wide part (that is, the shallowest wide part 26B) having small extended length with the progress of wear of the block 16A.

In detail, the sipe 24 having the above constitution has an open shape having three wide parts 26 as shown in FIG. 12A when the tire is a new tire. The wear proceeds from this state, and at the stage that the height of the block 16A has worn 30%, the shallowest wide part 26B at the ground contact end side Sh disappears as shown in FIG. 12B, and furthermore, the narrow part 30 disappears from the end thereof. The wear further proceeds, and at the stage that the height of the block 16A has worn 60%, the intermediate wide part 26C disappears, and the sipe has an opening shape having the deepest wide part 26A and one narrow part 30, as shown in FIG. 12C. The wear further proceeds, and at the stage that the wear has reached TWI, the sipe 24 completely disappears, although not shown.

Thus, the wide parts 26 sequentially disappear from the ground contact end side Sh with the progress of wear, and the length of sipe becomes short. As a result, the sipe 24 has excellent visibility as a wear indicator, similar to the fifth embodiment. Other constitutions in the sixth embodiment are the same as in the fifth embodiment, and the same effects as in the fifth embodiment are basically developed.

Other Embodiment

The wide parts 26 are preferably provided at three or more places in the sipe length direction G. When the wide parts 26 are provided at three or more places, the wide parts 26 disappear in a stepwise fashion with the progress of the wear, and as a result, the effect of suppressing the toe and heel wear can be enhanced. Furthermore, in the case of utilizing the sipe 24 as a wear indicator, further stepwise indication of the wear amount becomes possible. In this embodiment, the extended length in the sipe depth direction H is changed in all of the wide parts 26, but the wide parts 26 having the same extended length may be present.

In this embodiment, the sipe 24 is provided in all of the shoulder blocks 16A, but it is not always necessary to provide the sipe 24 in all of the shoulder blocks 16A. The land portion on which the sipe 24 is provided is not limited to the block line, and may be a rib which is a land portion continuous in the tire circumferential direction A. Furthermore, the same sipe can be provided on a region other than the shoulder region 22, that is, a center region 18 and an intermediate region 20. In such a case, it is preferred that the extended lengths in the sipe depth direction H of the wide parts 26 are sequentially decreased from the wide part 26 at one end side in the sipe length direction G to the wide part 26 at other end side thereof, so that the rigidity is set so as to change in one direction of the sipe length direction G. In the case that the sipe 24 is provided as an indicator indicating the wear amount, for example, the sipes 24 may be provided at plural places (for example, about 4 to 10 places) on the tire circumference.

The above pneumatic tire has excellent snow performance, and is therefore preferred as a winter tire such as studless tire, an all season tire, and the like, but may be applied to a summer tire. Although not described, various modifications or changes can be made without departing the scope and spirit of the invention.

Examples

Pneumatic radial tires having a tread pattern of the first embodiment shown in FIGS. 1 to 5D were produced by way of trial as Example 1. Pneumatic radial tires having a tread pattern of the fifth embodiment shown in FIGS. 9 to 10D were produced by way of trial as Example 2. Furthermore, pneumatic radial tires having a tread pattern in which a sipe having a constant groove width over the entire length direction was provided as the sipe (Comparative Example 1), a tread pattern in which a sipe having an opening shape shown in FIG. 5A constant in the sipe depth direction was provided (Comparative Example 2) and a tread pattern in which a sipe 100 shown in FIG. 13 was provided (Comparative Example 3), respectively were produced by way of trial. Snow braking performance and toe and heel wear amount of those trial tires were evaluated.

Each size of the sipe 24 in the tires of Examples 1 and 2 is as follows. Entire length Q of the sipe 24 is 21 mm, the size P in the sipe length direction G of the wide part 26 is 3 mm, the groove width W1 of the narrow part 30 is 0.3 mm, the groove width W2 of the wide part 26 is 0.82 mm, the sipe depth D is 6.9 mm, the extended length L1 of the deepest wide part 26A is 6.9 mm, the extended length L2 of the shallowest wide part 26B is 1.7 mm, the extended length L3 of the first intermediate wide part 26C is 5.1 mm, and the extended length L4 of the second intermediate wide part 26D is 3.4 mm. The height K of the shoulder block 16A was 8.5 mm.

Figure 13:
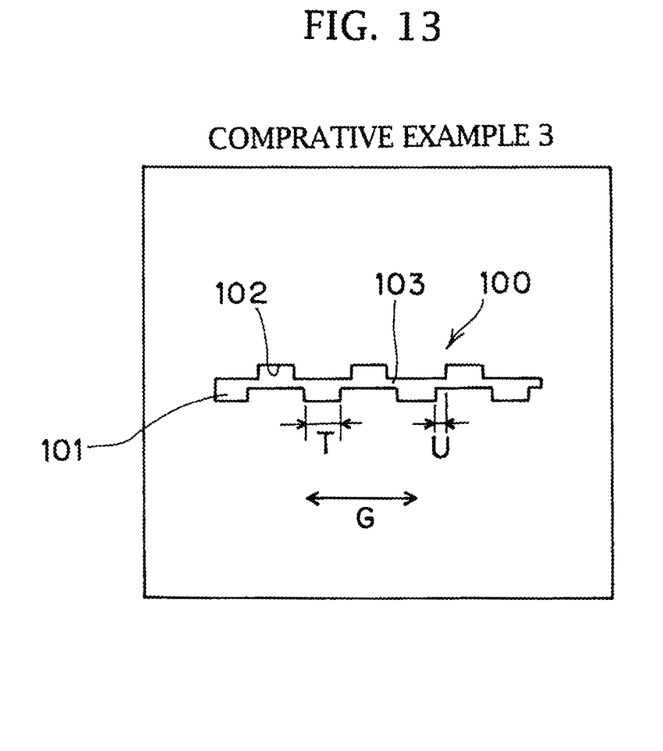
FIG. 13 is a plane view of the sipe according to Comparative Example 3.

The tires of Comparative Examples 1 to 3 differ from the tires of Examples 1 and 2 in only the sipe shape. In Comparative Example 1, the entire length of the sipe and the sipe depth are the same as those in the Example 1, and the groove width was 0.6 mm. In Comparative Example 2, the sipe of the Example 1 was changed to have an opening shape shown in FIG. 5A in the entire sipe depth direction, and each size was the same as that in the Example 1. The sipe 100 of Comparative Example 3 is that a depression 102 forming a wide part 101 is alternately formed at both sides of the sipe wall along the sipe length direction G, and was formed into a constant cross-sectional shape in the entire sipe depth direction. The entire length of the sipe 100, the sipe depth and the groove width of a narrow part 103 are the same as those in the Example 1. The groove width of the wide part 101 was 0.56 mm, the size T in the sipe length direction of the wide part 101 was 2.5 mm, and the size U in the sipe length direction of the narrow part 103 was 0.25 mm.

Four tires each having a tire size of 195/65R15 and a rim size of 15×6 were mounted on a 2,000 cc passenger car (FF sedan) (air pressure: 210 kPa), and the performance evaluation was conducted. The evaluation method is as follows.

Snow braking performance: Braking distance when the car ran on a snow road and braking force was applied to the car at a speed of 40 km/h to start ABS was measured. The evaluation was conducted to new tires and the tires when the shoulder block 16A wore 50%. The results were shown by the index that regarding the inverse number of the braking distance in the new tires and the 50% worn tires, the value of Comparative Example 1 is indicated as 100. The index means that the braking distance is short and the snow braking performance is excellent as the value is large.

Toe and heel wear amount: The difference in level by the wear between the stepping side and the kicking side in the wide part of the sipe was measured at the time of 50% wear of the shoulder block 16A, and the wear amount was shown by the index that regarding the reverse number of the difference in level by the wear, the value of Comparative Example 1 is indicated as 100. The index means that the toe and heel wear amount (that is, difference in level by the wear) is small and the biased wear resistance is excellent as the value is large.

The results are shown in Table 1. In the Examples 1 and 2, the edge effect was high due to the wide part which is a large thickness portion of the sipe. Furthermore, because the wide parts disappear from the ground contact end side in the course of the wear, the toe and heel wear amount was small. Particularly, in Example 1, the same snow braking performance as that of a new tire was obtained even at 50% wear, and in Example 2, the reduction effect of toe and heel wear was further excellent. On the other hand, in the Comparative Example 1, the sipe thickness was uniform. Therefore, the sipe was easily closed, thereby the edge effect was reduced. Furthermore, fall-down of the block easily occurred and the toe and heel wear amount was large. In Comparative Examples 2 and 3, because the wide part which is a large thickness portion of the sipe is present, the edge effect was high. However, fall-down of the block easily occurred, and the toe and heel wear amount was large.

TABLE 1

|  | Example 1 | Example 2 | Comparative Example 1 | Comparative Example 2 | Comparative Example 3 |
|---|---|---|---|---|---|
| Snow braking performance |  |  |  |  |  |
| New tires | 105 | 105 | 100 | 105 | 102 |
| 50% worn tires | 105 | 104 | 100 | 105 | 102 |
| Toe and heel wear amount | 107 | 108 | 100 | 99 | 99 |

As described above, according to the present embodiment, even though the sipe is closed in the narrow part of the sipe at the time of braking, the wide part prevents the sipe from being completely closed, and the edge effect can be developed. Furthermore, the toe and heel wear at the stepping side and the kicking side of the wide part can be reduced by that the wide parts gradually disappear with the progress of the wear. On the other hand, reduction in the edge effect is concerned due to that the wide parts disappear with the progress of the wear. However, the rigidity of the block itself is increased with the progress of the wear, so that the contact amount of wall surfaces of the sipe can be reduced, and the edge effect can be maintained. As a result, both the edge effect and the toe and heel wear suppressing effect can be achieved. Additionally, by utilizing that the sipe shape changes with the wear, the sipe can have the role as, for example, a wear indicator.

What is claimed is:

1. A pneumatic tire, comprising:
a sipe extending in a direction crossing a tire circumferential direction, provided on a land portion of a tread portion,
wherein the sipe comprises a wide part having a wide groove width at three or more places in a length direction of the sipe, the wide part and a narrow part having a small groove width are alternately formed on a tread surface along the length direction of the sipe, and a plurality of the wide parts extend from the tread surface in a depth direction of the sipe, and respective lengths that the plurality of wide parts extend in the depth direction of the sipe differ among the plurality of wide parts.

2. The pneumatic tire according to claim 1, wherein a plurality of the wide parts are set such that the extended length in the sipe depth direction is sequentially decreased from the wide part at one end side of the sipe length direction to the wide part of another end side thereof.

3. The pneumatic tire according to claim 1, wherein the sipe is provided on the land portion present in a tread shoulder region, and a plurality of the wide parts are set such that the extended length in the sipe depth direction is sequentially decreased as the wide parts approach a ground contact end side of the tread.

4. The pneumatic tire according to claim 1, wherein a plurality of the wide parts comprise a deepest wide part extending toward a sipe bottom side further than the center of the sipe depth direction and having the greatest extended length, a shallowest wide part extending in a sipe depth direction and terminating closer to a tread surface side than the center of the sipe depth direction and having the smallest extended length, and at least one intermediate wide part having an extended length between the length of the deepest wide part and the length of the shallowest wide part.

5. The pneumatic tire according to claim 1, wherein the wide part is formed by providing mutually facing depressions on the facing wall surfaces of the sipe.

6. The pneumatic tire according to claim 1, wherein the wide part is formed such that a size in the sipe length direction is gradually decreased with approaching the bottom side.

7. The pneumatic tire according to claim 6, wherein the sipe is provided on the land portion present in the tread shoulder region, a plurality of the wide parts are set such that the extended lengths in the sipe depth direction are sequentially decreased as the wide parts approach the ground contact end side of the tread, and a plurality of the wide parts are that the side surface at the tire center line side is formed vertically to the tread surface and the side surface at the ground contact end side of the tread is formed in an inclined shape inclining into the tire center line side as the side surface approaches the sipe bottom side.

8. The pneumatic tire according to claim 1, wherein the wide part is formed such that the groove width gradually decreases with approaching the bottom side.

9. The pneumatic tire according to claim 8, wherein the wide part is formed such that wall surfaces facing the groove width direction is formed in inclined shapes inclined so as to come close with each other as the wall surfaces approach the bottom side.

10. The pneumatic tire according to claim 1, wherein the narrow part is provided below the wide part in the sipe depth direction at the position where at least one wide part has been provided in the sipe length direction, and the wide part is changed to the narrow part with the progress of wear of the land portion.

11. The pneumatic tire according to claim 4, wherein the narrow part is provided below the wide part in the sipe depth direction at the position where
    other wide parts excluding the deepest wide part have been provided in the sipe length direction, and the wide part is changed to the narrow part with the progress of wear of the land portion.

12. The pneumatic tire according to claim 2, wherein the narrow part is not provided below the wide part in the sipe depth direction at the position where a plurality of the wide parts has been provided in the sipe length direction, the sipe is terminated at the wide part in the depth direction, and the sipe sequentially disappears from the end side where the wide part having small extended length has been provided, with the progress of wear of the land portion.

13. The pneumatic tire according to claim 1, wherein the sipe is provided with the wide parts at both ends of the sipe length direction.

14. The pneumatic tire according to claim 1, wherein the sipe is provided with the narrow parts at both ends of the sipe length direction.

15. The pneumatic tire according to claim 1, wherein the land portion is a block formed by circumferential grooves provided on the tread portion and transverse grooves crossing the circumferential grooves.

16. The pneumatic tire according to claim 13, wherein the sipe is a closed sipe the both ends of which do not open to a circumferential groove and which is terminated in the land portion.

* * * * *